United States Patent [19]

Frister

[11] 4,253,031
[45] Feb. 24, 1981

[54] DIRECTLY DRIVEN DYNAMO ELECTRIC MACHINE-GAS TURBINE GENERATOR STRUCTURE

[75] Inventor: Manfred Frister, Schwieberdingen, Fed. Rep. of Germany

[73] Assignee: Robert Bosch GmbH, Stuttgart, Fed. Rep. of Germany

[21] Appl. No.: 41,510

[22] Filed: May 22, 1979

[30] Foreign Application Priority Data

May 27, 1978 [DE] Fed. Rep. of Germany ....... 2823261

[51] Int. Cl.³ .......................... F01D 5/08; F01D 5/18; F01D 15/10; H02K 9/06
[52] U.S. Cl. ...................................... 290/52; 415/176; 416/DIG. 4
[58] Field of Search ................. 290/52; 310/131, 156; 415/55, 176; 416/181, DIG. 4

[56] References Cited

U.S. PATENT DOCUMENTS

| | | | |
|---|---|---|---|
| 1,166,316 | 12/1915 | Bentley | 416/181 |
| 1,528,754 | 3/1925 | Bresson | 290/52 |
| 1,861,262 | 5/1932 | Chesney | 310/131 |
| 1,901,154 | 3/1933 | Durdin | 416/181 |
| 2,180,168 | 11/1939 | Puffer | 290/52 |
| 2,508,397 | 5/1950 | Kane | 290/2 |
| 2,823,008 | 2/1958 | Grey | 416/181 |
| 2,970,234 | 1/1961 | Erickson | 415/55 |
| 3,187,191 | 6/1965 | Baggs | 290/52 |
| 3,291,446 | 12/1966 | Huebner | 416/181 |
| 3,816,751 | 6/1974 | Jampen et al. | 290/52 |
| 3,867,655 | 2/1975 | Stengel et al. | 290/52 |
| 3,961,199 | 6/1976 | Bronicki | 290/52 |
| 4,150,919 | 4/1979 | Matucheski | 416/181 |

OTHER PUBLICATIONS

The Way Things Work, pp. 64 & 65, 1967, vol. 1.

Primary Examiner—J. V. Truhe
Assistant Examiner—Shelley Wade
Attorney, Agent, or Firm—Frishauf, Holtz, Goodman & Woodward

[57] ABSTRACT

The rotor of a generator for automotive internal combustion engine turbo-superchargers is located on the turbine shaft to rotate therewith, at the turbine speeds of between 20,000 rpm to 80,000 rpm, and positioned between the exhaust gas turbine blade unit and the supercharger-compressor blade unit. The rotor, preferably, is a permanent magnet rotor, cooperating with stationery armature structures which may have different, separate windings thereon to supply different networks at independently selected voltages, for example a vehicular battery through a rectifier network and heating elements, in single-phase and three-phase connections, as desired, such as windshield heaters and the like, which can be directly a-c energized. The generator may have an axial air gap and may be cooled by a compressed air bleeder duct formed in the compressor blade unit.

17 Claims, 5 Drawing Figures

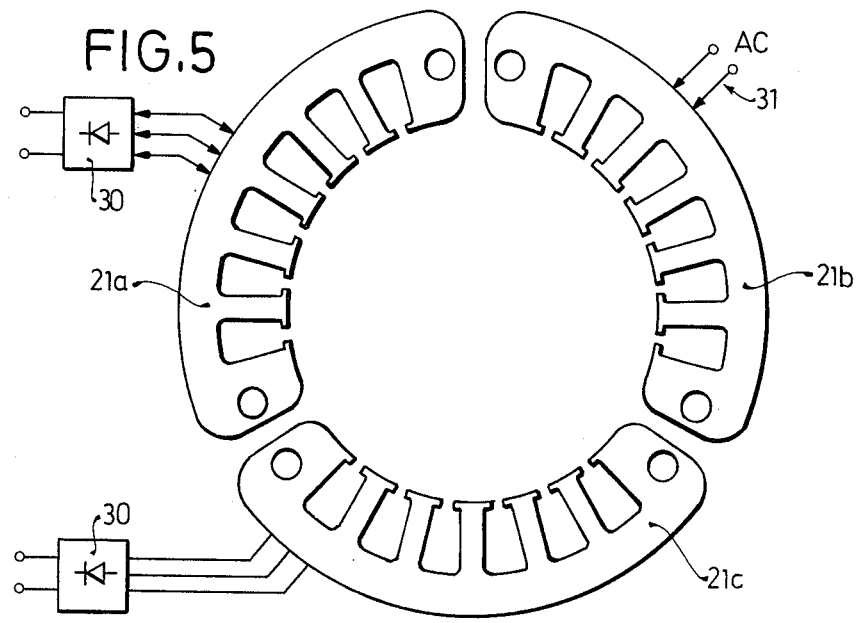

DIRECTLY DRIVEN DYNAMO ELECTRIC MACHINE-GAS TURBINE GENERATOR STRUCTURE

The present invention relates to a dynamo electric machine, and more particularly to a generator which can be directly driven by a gas turbine, specifically an exhaust gas turbine used in combination with a turbocharger for an internal combustion engine.

BACKGROUND AND PRIOR ART

Dynamo electric machines, and specifically alternating current generators, are widely used in motor vehicles, in which, customarily, the alternator is driven from the crankshaft of a piston-cylinder-type internal combustion engine by drive belts or the like. Alternators of this type are subject to wide speed variations, and thus must be capable of providing output within the entire range of drive speed. The drive speed variation to which such alternators are subjected may extend from idling speed, about 400 to 600 rpm, to about 6000 rpm. The speed range within which such alternators operate, therefore, can change in a ratio of 1:10; usual ranges of variation of speed between idling and maximum speed of the engine are in the order of about 1:6. The speed range within which the alternator must operate thus is extremely broad.

Alternators of the automotive type are usually supplied with field current over slip rings, which energize a field of the alternator with current pulses to provide the requisite voltage output within ranges which can be accepted by a floating vehicle battery. Frequently, the magnetic poles of the field winding are determined by the physical structure of the field, or the magnetic conditions within the range of the rotor. Interdigited or claw pole-type machines are frequently used. By control of the current through the field, the power supplied by the alternator is matched to the speed with which the alternator is driven at any instant. The alternators themselves, while of simple and rugged construction, still are subject to operating wear and tear; the slip rings, as well as the current supply brushes which connect field current to the field winding, introduce a loss in power and may be the cause of malfunction and maintenance problems.

Various types of internal combustion engines, both of the Otto and of the Diesel type, are equipped with turbo-chargers. One such type is an exhaust gas operated turbo-charger, in which the energy still available from exhaust gases is utilized to drive a compressor which supplies precompressed air to the intake of the internal combustion (IC) engine. This exhaust gas turbine-turbocharger compressor usually is a single-stage turbine receiving its drive energy from the exhaust gases of the associated IC engine. The compressor itself customarily is constructed in form of a radial blower or radial compressor which has a common shaft with the turbine blade wheel. Such exhaust gas operated precompressors or superchargers operate at very high speed; depending on the construction type, they may operate between 20,000 and 80,000 rpm. Under normal operation, however, the variation in speed, that is, the range of speeds with which such turbines and superchargers operate is much less than the speed range of the IC engine itself. Further, the turbine-supercharger combination is rarely subject to rapid changes in speed, as is an IC engine for vehicular use, for example operating between idling and close to maximum speed within a very short interval if it is desired to rapidly accelerate a vehicle from standstill to highway cruising speed.

THE INVENTION

It is an object to provide a dynamo electric machine construction which can be readily combined with an exhaust gas turbine-precompressor or supercharger to form an integral unit therewith and to receive its drive power directly from the exhaust gases which drive the exhaust gas turbine.

Briefly, the rotor of the generator is directly seated on the shaft of the exhaust gas turbine-supercharger combination. The alternator may be of the cylindrical air gap or of the radial air gap type. In accordance with a feature of the invention, the air which is being compressed for supply to the IC engine is connected through bleeder openings or bleeder ducts to provide cooling air to the alternator windings. The alternator field can be remotely excited, it may consist of a permanent magnet arrangement or the alternator can be operated as an asynchronous machine in which the field is formed by a short-circuited winding.

The very high rotational speed of the exhaust gas turbine permits substantial reduction in the size of the alternator structure and efficient utilization of available space, since the rate of change of flux from the high-speed field with respect to the stationary armature windings is substantially higher than the flux change rate in alternators driven from the crankshaft of an IC engine. The operating efficiency of the generator is improved. In accordance with an advantageous feature of the invention, the rotating field is a permanent magnet field so that no rubbing or sliding contact between a stationary part and a rotary part of the turbine will result; due to the very high operating speed, adequate power output can be obtained by the magnetic field induced from the rotor in the armature windings. If the rotor is constructed for asynchronous operation, that is, with a short-circuit winding, slip ring contacts and similar connections likewise are eliminated.

The alternator structure is preferably so arranged that the operating components thereof, and primarily the rotor, are constructed in the form of reusable or interchangeable parts. The rotor, preferably, has a split hub, so that it can be readily removed from the shaft of the exhaust gas turbine and compressor unit to permit replacement of respective elements with minimum disassembly and assembly time, which is desirable in view of the extremes of environmental conditions to which the exhaust gas turbine-alternator-supercharger compressor can be exposed.

Drawings, illustrating examples:

FIGS. 4 and 5 are plan views of two embodiments of armature lamellae from which armature stacks can be assembled.

Figure 1:
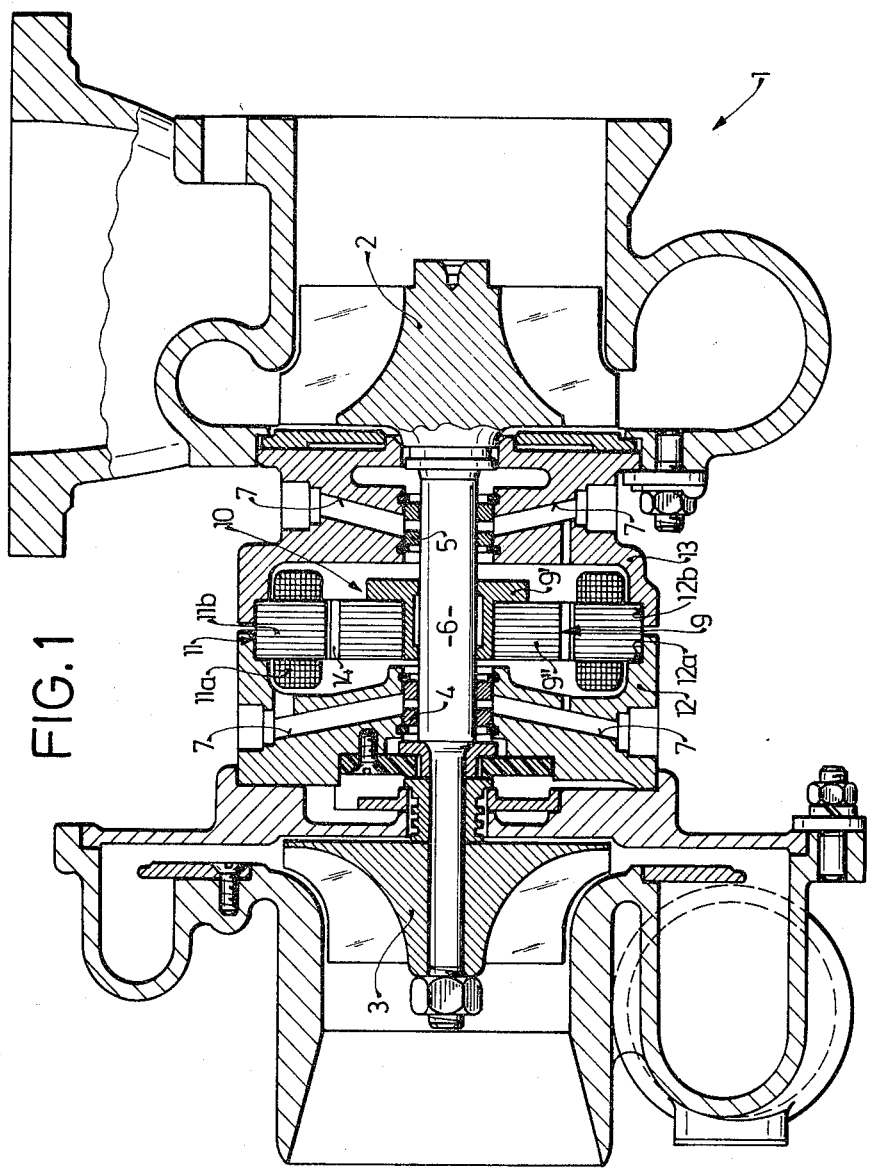
FIG. 1 is a highly schematic longitudinal section through an exhaust gas turbine-supercharger-alternator combination, and illustrating the basic principle of the structural arrangement of the alternator within the exhaust gas turbine-compressor unit.

A turbo-charger 1 has a turbine wheel 2 subjected to a stream of gases, typically exhaust gases, from a reciprocating internal combustion engine. The turbine wheel 2, which is of standard construction for such purposes, is secured to an operating shaft 6 which carries at its other axial end a compressor wheel 3 to compress air supplied thereto and provide supercharging or precharging air for the internal combustion engine. Bearings 4, 5 are secured in the overall housing structure for the unit 1, as well known.

Figure 2:
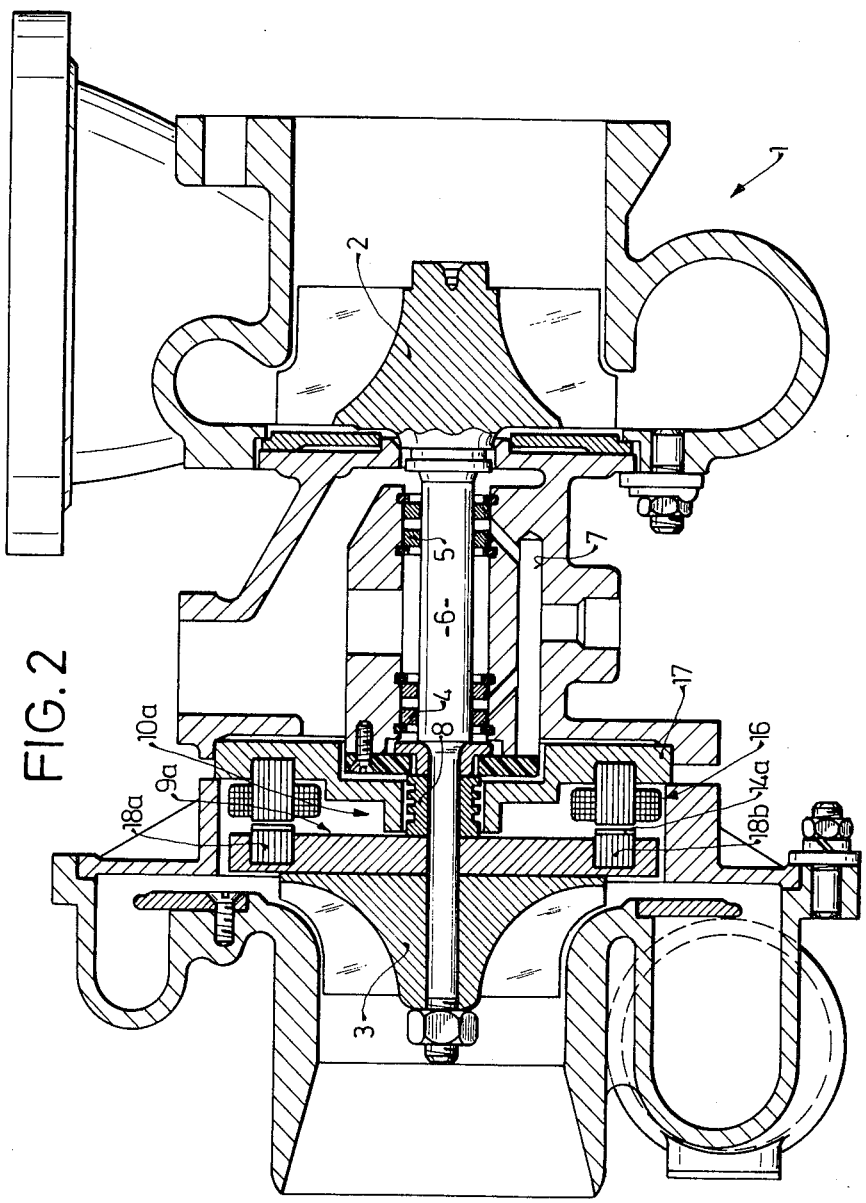
FIG. 2 is a view similar to FIG. 1 and illustrating a construction using an axial air gap.
Figure 3:
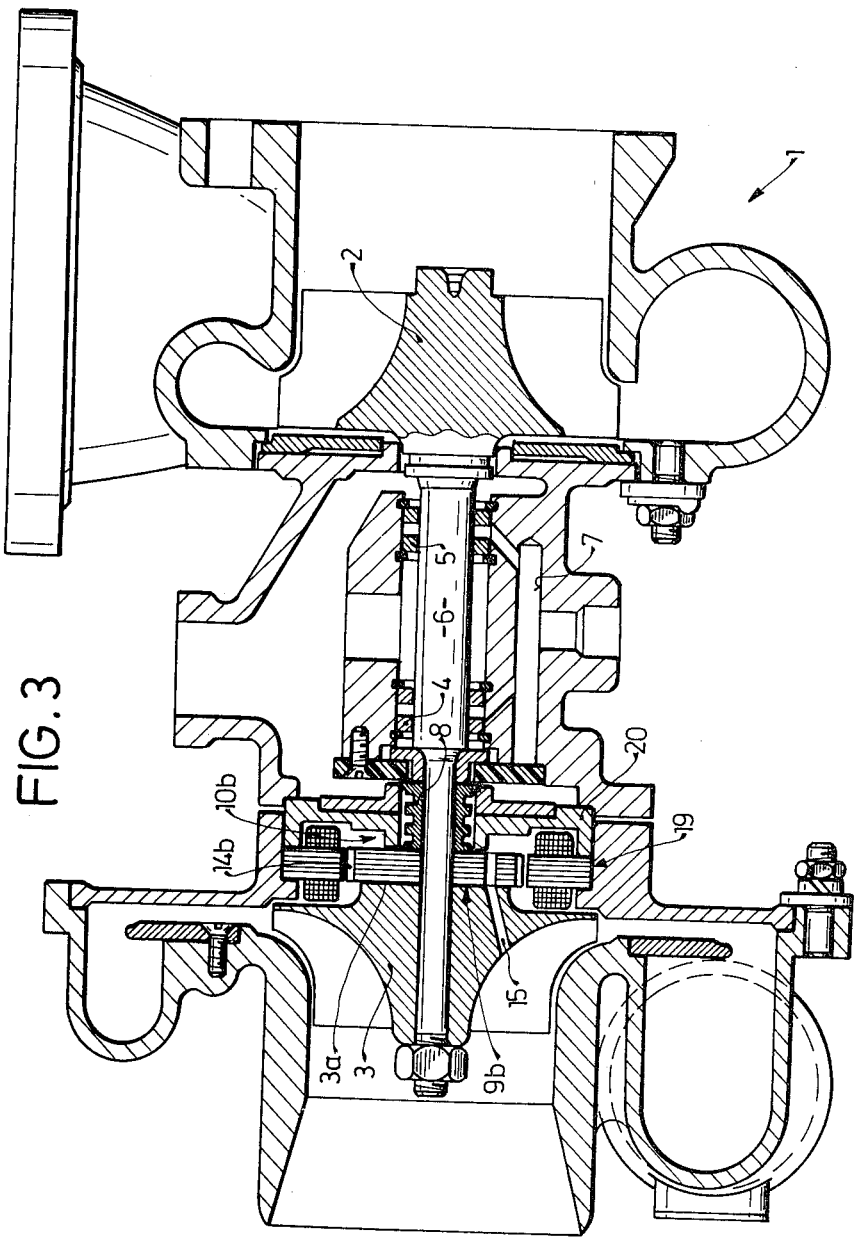
FIG. 3 illustrates a further alternative, in longitudinal schematic section, in which the rotor is secured to the compressor wheel and the magnetic field lines extend primarily in radial direction.

The shaft 6 is lubricated by oil supplied through oil ducts 7. In accordance with the invention, an electrical generator is located between the turbine and compressor portions of the unit. Its rotor is secured to the shaft 6. In the embodiments of FIGS. 2 and 3, a sealing element 8 is located between the turbine portion of the unit and the generator portion thereof.

Both the turbine as well as the compressor are shown only generally and schematically since they may be of any suitable construction known in the industry. The construction of the turbine portion and the compressor portion of the combined element does not form part of the present invention. Their operation is also generally known.

The rotor of the generator unit is secured to the shaft 6 to rotate therewith. The generator is positioned between the turbine or, more specifically, between the turbine wheel 2 and the compressor or, more specifically, the compressor wheel 3. The alternator may be constructed as a radial air gap or as an axial air gap machine. Regardless of the construction, however, the rotor 9 (FIG. 1), 9a (FIG. 2) and 9b (FIG. 3) is secured to the shaft 6, to rotate therewith, and hence at the speed of the turbine wheel, which is the same as that of the compressor wheel 3, respectively. The connection between the rotor of the generator and the shaft is preferably such that it can be severed without excessive disassembly procedures, as will be explained below.

The generator is usually a three-phase alternator generally shown at 10 (FIG. 1), 10a (FIG. 2), 10b (FIG. 3).

Embodiment of FIG. 1, alternator 10: The rotor 9 is located approximately centrally between the turbine wheel 2 and the compressor wheel 3 on the common shaft 6 which connects the wheels 2 and 3. The rotor 9 has an inner central sleeve 9' which is formed with a radial flange. Sleeve 9' is seated on the shaft 6. The flange, and the corner formed by the flange, holds the magnetic portion 9" of the rotor which, preferably, is a permanent magnet of suitable composition and shape. The armature stack 11 is surrounded by the armature winding 11a and is formed of armature laminations 11b which are secured in corner notches or grooves formed in housing portions 12, 13, which housing portions also retain the bearings 4, 5 for the shaft 6. The grooves or notches which hold the armature core formed of the lamellae 11b is shown at 12a, 12b. The air gap 14 is cylindrical, that is, the magnetic flux between the rotor 9 and the stator windings 11a, acts radially.

Features common to the embodiments of FIGS 1-3: The armature may include a plurality of windings, or may be formed in segments. It has at least one winding assembly in which the flux changes in direction and intensity as the rotor 9 rotates. The alternating field generated by the rotor 9 (or 9a, 9b, respectively) can be generated by forming the rotor as a claw pole rotor, salient pole, or otherwise shaped rotor which includes permanent magnet elements, located in desired and suitable arrangement, and suitably shaped, so that the respective air gap 14, 14a, 14b provides alternating flux to the armature core lamellae, thus inducing a voltage in the armature windings 11b. The particular construction of the rotor itself may be in accordance with any well known permanent magnet alternator arrangement.

The rotor 9 may also be constructed in form of a flux guide element, for example a star wheel or the like, to induce a voltage in the armature by generating pulsations of magnetic flux. The rotor may, also, be formed with a short-circuit winding, so that the resulting generator will operate as an asynchronous alternator.

The voltage induced in the armature winding will be substantial due to the high speed with which the rotor operates, so that even a structurally small and simple alternator can generate substantial power. The voltage induced in the armature windings preferably is rectified although this is not strictly necessary for operation of the generator. For certain uses, for example for onboard mobile use of a self-contained network, for example for vehicular use, the armature may be wound such that a portion of the energy derived therefrom is rectified to charge a floating battery, or to supply a d-c network; whereas another portion is used directly in the form of alternating current.

No special cooling is necessary for the generator due to the very high speed of rotation of the rotor. If the loading of the generator winding is such that additional cooling thereof is desirable, then a portion of the air compressed by the compressor wheel 3 can be bled off and directed to cool the generator windings. FIG. 3 shows a duct 15 drilled into the compressor wheel 3 to bleed off cooling air to be directed towards the generator.

Embodiment of FIG. 2: The rotor 9a is located immediately adjacent the compressor wheel 3 and, preferably, is secured thereto. The air gap 14a is axially directed. The armature windings 16 are fitted into an armature carrier 17 which is formed as a stepped disk having substantial radial extent, the stator overlapping seal 8 to reduce axial length. The armature assembly 16 is a ring-type armature. The rotor 9a is constructed in form of a disk which is secured to the compressor wheel 3, and seated on shaft 6 and forms a cooling air directing element as well. It includes a plurality of permanent magnets 18a, 18b, seated in a holding disk secured to the wheel 3. The permanent magnets 18a, 18b form the field poles of the rotor 9a, extending in axial direction and acting with their magnetic flux on the stator winding which is so positioned in the carrier 17 that the axially changing magnetic field induces a voltage therein, as is well known in connection with axial air gap-type dynamo electric machines. Seal 8 prevents escape of lubricant from the bearings 4, 5.

Embodiment of FIG. 3: The generator is a radial or cylindrical air gap generator, but located non-symmetrically between the turbine wheel 2 and the compressor wheel 3. In accordance with a feature of the invention, it is located close to the compressor wheel 3 for ease of cooling and, preferably, and as shown, secured to the compressor wheel 3 itself. The compressor wheel 3 is formed with a small axial extension 3a. The armature 19 is secured in a carrier 20 which holds the armature in a suitably shaped groove or seat formed in the housing portion of the turbine-compressor unit immediately adjacent the compressor section thereof, as clearly seen in FIG. 3. The inner projection 3a of the compressor wheel 3 carries the rotor 9b.

The compressor wheel 3 is formed with ducts 15 to supply cooling air to the generator by bleeding air from the compressor section itself. The ducts preferably continue through the lamellae of the rotor to provide cooling air, under positive pressure due to the compressing effect of the compressor wheel 3 both to the rotor as well as to the stator assembly, including the stator windings.

The generator connected directly to the shaft or to the compressor wheel of a turbine-compressor assembly is practically maintenance-free; it is not subjected to any mechanical wear, in spite of the high speed, since the respectively movable parts, namely rotor 9, 9a, 9b and the stationary portions do not have any frictional or sliding engagement. The rotor can be suitably encapsulated and protected against external influences and contamination.

Turbine-compressor assemblies are subject to severe operating conditions; both the turbine blade carrier wheel as well as the compressor wheel are subject to wear, and may require replacement from time to time. It is, therefore, desirable to so construct the generator that it, and specifically its rotor part, can be readily disassembled from the shaft, or the compressor wheel, respectively, so that the generator element secured thereto is not wasted. In accordance with a feature of the present invention, therefore, both the stator as well as the rotor are independently seated and secured within the housing structure assembly, and are separately attached to the shaft 6, or the compressor wheel 3, respectively, to permit reuse of the electrical components of the complete turbine-supercharger-generator combination. The rotor, specifically, is preferably so secured to drive shaft 6 or to the compressor wheel 3, or its extension 3a (FIG. 3), respectively, that it is releasably attached thereto and can be reassembled to the same or a new shaft, or new compressor wheel after disassembly and exchange of those portions of the turbine-compressor unit which require replacement.

The stator portion is preferably wound on stator lamellae which can be radially separated. FIGS. 4 and 5 show plan views of suitable stator core structures. A plurality of various windings, located in the slots of stator elements 21a, 21b, 21c (FIG. 5) or 21a', 21b' (FIG. 4) can be connected to different utilization circuits, winding portion located, for example, in the section 21a (FIG. 5) or 21a' (FIG. 4) can be connected over a rectifier network, for example a rectifier bridge 30 to provide a d-c output to supply the d-c network on-board of a motor vehicle; an output circuit 31 can be connected to a winding in 21', to supply three-phase a-c or, if desired, single-phase a-c for other current utilization devices, for example to provide power for heating, such as windshield or rear window heating, without loading the on-board d-c network. The winding placed on portion 21c may, for example, by suitable choice of wire with respect to the wires used in section 21a, provide output voltages at different levels from that of the windings in the slots of section 21a. The windings themselves have been omitted from FIGS. 4 and 5 for clarity; they may be wound within the slot in any suitable and well known manner.

The system described can be used with various types of dynamo electric machines, for combination with exhaust gas turbine- supercharger- or precharger- compressors, so that the respective dynamo electric machine, operating as a generator, provides electrical power output. Usually, the exhaust gas turbine is part of the exhaust system of a reciprocating internal combustion engine, or so associated therewith that the compressor portion provides precompressed charging air to the internal combustion engine. Thus, the quantity of air supplied for each stroke of the internal combustion engine can be greatly in excess of that which can be obtained by mere suction action of the piston of the reciprocating engine itself. Such a supercharger or precharger, operated as a rotary compressor, when driven by the exhaust gases from the very same engine itself, is usually referred to as a turbo-charger. It has its own rotational speed which is independent of the rotary portions of the internal combustion engine, with which it cooperates.

In essence, the present invention is based on the combination of an electrical generator with a turbo-charger in such a manner that the generator will rotate at the extremely high speed of the turbo-charger, rather than at the customary speed of mobile, and particularly automotive-type of alternators. The high speed permits much smaller construction with substantial power output which is more easily regulated since the speed range with which the generator is operated is less than the speed range of the internal combustion engine itself.

Generators which can be directly incorporated in the turbine can be of various types, but preferably do not have any moving contacts, such as slip rings. They can be, for example, of the flux change type, flux conduction type, permanent magnet generators, or asynchronous generators.

The savings in space and weight in a flux change type generator with respect to a standard claw-pole type generator customary in the automotive field is reduced by the fact that, in a claw-pole type generator, there is a flux reversal upon change between one pole and the next, whereas the changing field in a flux change type generator does not provide for reversal. Thus, the armature winding has to be increased in length—and hence in size—and space for the increased armature winding must be provided; additionally, the stator must provide space for the field. The increase in speed of a turbine-coupled generator is a factor of about 10; inview of the structural differences, however, the overall advantage becomes reduced to a factor of about 3. Electrically excited generators can be voltage-controlled with conventional voltage regulators. In permanent magnet generators, it is desirable to use a regulator in which the output power is chopped or periodically short-circuited so that an average output voltage at the proper level is obtained. Solid-state switches, coupled with smoothing capacitors and chokes are desirable. In automotive use, the battery will additionally operate as a buffer.

Operation of alternators coupled to an exhaust gas turbine makes additional control equipment desirable which prevents loading the turbine at low speed, so that the turbine will not be excessively braked. This can be obtained by suitably modifying a conventional voltage regulator, for example its input circuit, by obtaining a speed-responsive signal which, when a speed below a critical value is sensed, interrupts delivery of output from the generator or, for example, interrupts excitation of the generator. The inherent action of automotive-type alternators then will prevent drain of power from the battery to the generator, by isolating the generator from the electrical network when its voltage drops, due to loss of excitation. When the speed, then, increases above the preset value—depending on the design of the turbine—voltage can then be regulated in conventional manner, for example by ON-OFF regulation of the output, of the excitation field, or both.

The generators which are directly coupled to an exhaust gas turbine can be so constructed that the armature reaction will build up a reaction field which, in a manner similar to conventional generators, protects the generators against overloading.

A comparison of a conventional claw-pole type automotive generator with a turbine, with nominal voltage of 14 V and output power of 1 kW shows: minimum and maximum speeds of the conventional generator: 1000/15,000 rpm; for the turbine-driven generator: 10,000/100,000 rpm. Stator outer diameter, stator inner diameter and axial length: 138 mm, 101 mm, 24 mm (conventional); 95 mm, 35 mm, 24 mm (turbine-driven). The air gap, in both cases, was 1 mm. The active weight of the conventional generator is 3.5 kilograms, the overall weight 5.4 kg (conventional), which compares with an active weight of 1.5 kg for the turbine-driven generator, which does not require any "overall" additional weight since it is directly built-in with the exhaust gas turbine unit, and the only increase in weight of the exhaust gas turbine unit is occasioned by the alternator structure. Theoretically, the about 10-times speed of the exhaust gas turbine-driven structure should result in only 1/10 of the weight of the active portions. Since the flux change type generator, which forms the example, does not provide for flux reversal, however, the electrical structure has to be differently designed, as disclosed above.

Various changes and modifications may be made, and features described in connection with any one of the embodiments may be used with any of the others, within the scope of the inventive concept.

I claim:

1. For use in combination with an internal combustion engine, an electric generator - exhaust gas turbine - supercharging compressor assembly in which
   the exhaust gas turbine (1) has a turbine blade unit;
   the generator has a stator (11, 16, 19) and a rotor (9, 9a, 9b);
   and the supercharging compressor has a compressor rotor unit;
   and a common operating shaft (6) on which the turbine blade unit, the rotor of the generator, and the compressor unit are mounted,
   the generator being positioned between the gas turbine unit and the supercharging compressor unit with the generator rotor secured to said common shaft (6) between the turbine blade unit (2) and the compressor rotor units;
   and a compressed air bleeder duct (15) formed in the compressor blade unit and directing cooling air to the generator.

2. Assembly according to claim 1, wherein the rotor (9a, 9b, 9c) and the stator (11, 16, 19) of the generator (10, 10a, 10b) are separable from the shaft (6), the turbine blade unit (2) and the compressor rotor unit (3).

3. Assembly according to claim 1, wherein the rotor (9a, 9b, 9c) of the generator is separable from said shaft (6) independently of removal of the turbine blade unit and the compressor rotor unit (3).

4. Assembly according to claim 1, wherein the rotor (9a, 9b) of the generator is positioned immediately adjacent the compressor rotor unit (3).

5. Assembly according to claim 4, wherein (FIG. 2) the rotor of the generator includes a disk-shaped element positioned immediately adjacent to the compressor rotor unit and forming a portion of the air directing structure thereof.

6. Assembly according to claim 1, wherein the rotor of the generator includes a permanent magnet-type rotor.

7. Assembly according to claim 1, wherein the rotor of the generator includes a star wheel or flux modulator or flux guide rotor to non polarity reversing pulsating magnetic flux and provide for change in flux affecting the stator.

8. Assembly according to claim 1, wherein the generator is an asynchronous generator, and the rotor includes a short-circuit winding.

9. For use in combination with an internal combustion engine, an electric generator - exhaust gas turbine - supercharging compressor assembly in which
   the exhaust gas turbine (1) has a turbine blade unit (2)
   the generator has a stator (16) and a rotor (9a),
   and a supercharging compressor has a compressor rotor unit;
   and a common operating shaft (6) on which the turbine unit, the rotor of the generator, and the compressor rotor unit are mounted,
   the generator being positioned between the gas turbine unit and a supercharging compressor unit with the rotor (9a) of the generator secured to said common shaft between the turbine blade unit (2) and the compressor unit (3);
   wherein the generator is an axial air gap generator, the rotor and stator being axially stacked along the length of said shaft (6), the rotor (9a) of the generator being positioned immediately adjacent the compressor rotor unit (3).

10. Assembly according to claim 9 further comprising a compressed air bleeder duct (16) formed in a compressor blade unit (3) and directing cooling air to the generator.

11. Assembly according to claim 9 wherein the rotor of the generator is positioned to form a portion of an air directing structure directing cooling air taken from air compressed by the compressor rotor.

12. Assembly according to claim 9 further including an axial seal (8) separating the turbine blade unit (2) from the generator and the compressor rotor unit,
   said turbine seal (8) being located in at least approximate axial alignment with the stator (16) of the generator to form a compact structure in which the stator of the generator axially overlaps said axial seal.

13. Assembly according to claim 9, wherein the rotor (9a, 9b, 9c) and the stator (11, 16, 19) of the generator (10, 10a, 10b) are separable from the shaft (6), the turbine blade unit (2) and the compressor rotor unit (3).

14. Assembly according to claim 9, wherein the rotor (9a, 9b, 9c) of the generator is separable from said shaft (6) independently of removal of the turbine blade unit and the compressor rotor unit (3).

15. Assembly according to claim 9, wherein the rotor of the generator includes a permanent magnet-type rotor.

16. Assembly according to claim 9, wherein the rotor of the generator includes a star wheel or flux modulator or flux guide rotor to generate non polarity reversing pulsating magnetic flux and provide for change in flux affecting the stator.

17. Assembly according to claim 9, wherein the generator is an asynchronous generator, and the rotor includes a short circuit winding.

* * * * *